(12) United States Patent
Mccarter et al.

(10) Patent No.: US 12,474,028 B2
(45) Date of Patent: Nov. 18, 2025

(54) LIGHT ASSEMBLY FOR A MOTOR VEHICLE INCLUDING A SHAPED FILM

(71) Applicant: PO Lighting Czech, s.r.o., Senov u Noveho Jicina (CZ)

(72) Inventors: Glenn Mccarter, Senov u Noveho Jicina (CZ); Michael Vangilder, Senov u Noveho Jicina (CZ); Timothy Pelech, Senov u Noveho Jicina (CZ)

(73) Assignee: PO Lighting Czech, s.r.o., Senov u Noveho Jicina (CZ)

( * ) Notice: Subject to any disclaimer, the term of this patent is extended or adjusted under 35 U.S.C. 154(b) by 0 days.

(21) Appl. No.: 19/079,403

(22) Filed: Mar. 13, 2025

(65) Prior Publication Data

US 2025/0290611 A1  Sep. 18, 2025

(30) Foreign Application Priority Data

Mar. 15, 2024  (EP) .................................. 24164002

(51) Int. Cl.
| | |
|---|---|
| *F21S 41/20* | (2018.01) |
| *F21S 41/141* | (2018.01) |
| *F21S 43/14* | (2018.01) |
| *F21S 43/235* | (2018.01) |

(52) U.S. Cl.
CPC ............ *F21S 41/285* (2018.01); *F21S 41/141* (2018.01); *F21S 43/14* (2018.01); *F21S 43/235* (2018.01)

(58) Field of Classification Search
CPC .......... F21S 41/24; F21S 41/25; F21S 41/141; F21S 43/14
See application file for complete search history.

(56) References Cited

U.S. PATENT DOCUMENTS

| | | |
|---|---|---|
| 4,860,174 A | 8/1989 | Kato |
| 5,128,839 A | 7/1992 | Kato |
| 11,415,292 B2 | 8/2022 | Buisson |
| 2012/0268940 A1 | 10/2012 | Sahlin |

(Continued)

FOREIGN PATENT DOCUMENTS

| | | |
|---|---|---|
| CN | 210345328 U | 4/2020 |
| CN | 111520685 A | 8/2020 |

(Continued)

OTHER PUBLICATIONS

European Patent Office, European Search Report for European Priority Application No. EP24164002, Dated May 28, 2024.

*Primary Examiner* — Eric T Eide

(57) ABSTRACT

A lamp module (10) comprising a housing (12) covered by a translucent cover (14), defining between them an internal chamber (18) which comprises: a functional layer (31) facing cover (14), a light guide (24) facing the functional layer (31), and light sources (22) configured to emit light rays into the light guide (24). The functional layer (31) comprises a thermoformed sheet made of an optically transmitting material attached, at a first end (31A), to a first internal surface (16SA) of the housing and, at a second end, to a second internal surface of the housing. The sheet is shaped so as to form, between said first end (31A) and second end a curved section (34) facing the emitting surface (24L) of the light guide, the emitting surface (24L) and the curved section (34) being separated by an air gap (36) of a width above 10 mm (0.4 in).

15 Claims, 2 Drawing Sheets

(56) References Cited

U.S. PATENT DOCUMENTS

| | | | | |
|---|---|---|---|---|
| 2016/0069525 A1* | 3/2016 | Chen | ............ | F21S 41/151 |
| | | | | 362/612 |
| 2018/0149335 A1* | 5/2018 | Paroni | ............ | G02B 19/0066 |
| 2019/0170317 A1 | 6/2019 | Gloss | | |
| 2021/0372592 A1* | 12/2021 | Nykerk | ............ | F21S 41/143 |
| 2022/0260228 A1* | 8/2022 | Thaliath | ............ | F21S 43/40 |
| 2023/0408054 A1 | 12/2023 | Muegge | | |

FOREIGN PATENT DOCUMENTS

| | | |
|---|---|---|
| DE | 3901981 A1 | 1/1990 |
| DE | 102018130056 A1 | 6/2019 |
| DE | 102022113052 A1 | 11/2023 |
| FR | 3078140 A1 | 8/2019 |
| FR | 3134165 A3 | 10/2023 |
| JP | 2000067611 A | 3/2000 |
| KR | 20160129446 A | 11/2016 |

\* cited by examiner

LIGHT ASSEMBLY FOR A MOTOR VEHICLE INCLUDING A SHAPED FILM

FIELD

The invention relates to the domain of the automotive industry, and particularly to a motor vehicle lamp.

In particular, the invention relates to an LED lighting unit using a light guide that conforms to a light distribution standard for a vehicle lamp such as a headlight, auxiliary headlight, spot light, tail light, signal lamp, traffic lamp, or other vehicle lamp using the same.

BACKGROUND

A conventional LED lighting unit mounted in vehicle lamps usually includes a plurality of LEDs, a light guide for guiding the light from the LEDs, and a reflector. Each of the plurality of LEDs has an optical axis located in a direction towards or corresponding with a light-emission direction of the associated vehicle lamp and reflector. Therefore, the conventional LED lighting unit illuminates both a direct light emitted by the plurality of LEDs and an indirect light reflected on the reflector forward in a direction towards or corresponding with the light-emission direction via a front lens located in front of the light guide.

However, because each of the plurality of LEDs possesses characteristics of an approximately point light source, both the direct light propagated by the light guide and indirect light reflected from the reflector form a light distribution which scatters each projection image of a plurality of point light sources on the front lens. This results in an irregularity of brightness, and thus a non-homogenous overall projected light.

To improve the overall homogeneity of the projected light, it is known from U.S. Pat. Nos. 11,256,018 and 11,047,546 to add to the lighting unit a planar functional layer that is laterally spaced from the front side of the light guide and can help homogenizing the light propagated by the light guide. These planar functional layers are used to manage the light exiting the light guide, which adds to overall uniformity and optical efficiency. This results in a thin package depth and a pleasing uniform appearance.

However, new vehicle lighting systems do not only focus the optical output increasing the driving comfort and traffic safety, but also on appearance. Modern point and planar light sources, especially LED and OLED sources, have opened a new chapter for new stylistic options of car designers. In particular, there is an increasing trend to add a variety of aesthetic and functional effects.

The above conventional, "flat" light modules lack a sense of depth, making them highly suitable for applications that are essentially 2-dimensional, but are unable to provide 3-dimensional effects.

To obtain these kinds of effects, a plurality of lenses that are stacked within the housing of the lighting unit between the light guide and the front lens are conventionally used. This can result in relatively high-density and massive lighting unit that are resistant to crushing and breakaway movement in case of collision. Massive lighting units also have further disadvantages such as having a high mass which reduces the fuel efficiency of the vehicle, requiring stronger vehicle attachment to support the lamp, reducing available interior space, etc.

As a result, there exists a need to provide a lighting unit that allows for 3-dimensional effects while having a high crashworthiness.

To that end, the invention concerns a lamp module for a motor vehicle comprising a housing covered by a translucent cover which separates the lamp module from the external surroundings of the vehicle lamp module, defining between them an internal chamber, the lamp module further comprising, within the internal chamber:
  at least one functional layer comprising an emitting surface facing the translucent cover, configured to transmit the light rays exiting from its emitting surface in at least a predetermined direction,
  a light guide made of an optically transmitting material comprising an emitting surface facing the functional layer,
  a plurality of light sources, preferably light-emitting diodes, located opposite an entry surface of the light guide and configured to emit light rays into the light guide,
  characterized in that the functional layer comprises a thermoformed sheet made of an optically transmitting material, preferably made of a thermoplastic material, that is attached, at a first end, to a first internal surface of the lamp module located at a first end of the internal chamber and, at a second end, to a second internal surface of the lamp module located at a second end of the internal chamber, the sheet being shaped so as to form, between said first and second ends, a curved section facing the emitting surface of the light guide, the emitting surface of the light guide and the curved section of the sheet being separated by an air gap having a width the value of which is above 10 mm (0.4 in).

An optically transmitting material is a translucent, semi-transparent or a transparent material. It may include materials that are milky, smoked, mottled, textured, surface printed, frosted, etc., as long as they allow light to go through.

Owing to the fact that the functional layer is made of a thermoformed sheet that is shaped so as to form, between said first and second ends, a curved section facing the emitting surface of the light guide, and that is separated from the emitting surface of the light guide by an air gap of significant width, the functional layer may be given a highly styled shape and create 3-dimensional effect. Indeed, unlike the functional layers from the prior art, the sheet has a non-planar shape as the shaping gives to the sheet an overall 3-dimensional shape.

The shaped sheet manages the light exiting the light guide, which adds to overall uniformity and optical efficiency, while the air gap allows increasing the total internal reflection within the internal chamber.

This results in a thin package depth and a pleasing uniform and styled appearance, which also has high crashworthiness considering the sheet, unlike the lenses of the prior art, can easily be crushed and offers little resistance in the case of an impact. Moreover, the sheet can also be pierced or contain die-cut holes, be printed or altered to produce a variety of aesthetic and functional effects such as adding logos or multicolored decorative graphics, line or pattern structures, or blocking undesired stray light areas in the lighting module for added visual interest.

The invention extends the concept of surface LED light modules into the third dimension, reducing restrictions on vehicle studio styling and opening new possibilities for overlapping 3-dimensional visual effects. By placing the sheets at a much larger distance from the surface LED light guide, even higher uniformity can be achieved. By replacing conventional injection-molded 2.5 mm (0.1 in) thick inner lenses with sheets, tooling costs can be greatly reduced. Moreover, by substituting thin sheets for inner lenses, overall lamp mass can be decreased by up to 30%, enabling higher performance in meeting pedestrian protection requirements.

Preferably, the sheet is made of polycarbonate. Such a material can be easily shaped and has the required properties to obtain the sought 3-dimensional effects.

To limit the overall thickness of the lighting module and to obtain a sheet that is easily shaped, the sheet has a thickness the value of which is comprised between 0.2 mm (0.008 in) and 0.8 mm (0.03 in).

To maximize the 3-dimensional effects, the width of the air gap between the emitting surface of the light guide and the curved section of the first sheet varies between the first end of the sheet and the second end of the sheet, and a central part of the emitting surface of the light guide is located in the widest part of the air gap.

Preferably, in order to further create additional 3-dimensional effects and/or to homogenize the lighting output of the lighting module, the sheet comprises at least one functional element that is arranged on its surface and/or is part of its internal structure, adapted to bend the beams of light rays exiting from its emitting surface.

For example, the at least one functional element includes a raised element, for example a rib or a dimple.

According to a particular embodiment that limits the manufacturing costs, the raised element is obtained through thermoforming.

Preferably, to improve the esthetic features provided by the sheet, the functional element includes a line or pattern structure, for example obtained by a layer of print, for example a silk-screen, an ink jet print.

The sheet can also include ridges, bumps, grid lines, random valleys, raised patterns, etc.

Advantageously, to improve the outcoupling efficiency of the light guide, it comprises a back surface, opposite its emitting surface, which comprises a raised pattern on its back surface preferably including dents evenly distributed along the back surface.

Preferably, the light sources are located on a support that is located against an internal surface of the housing, the support preferably being a printed circuit board.

Advantageously, so as to scatter and recycle the light emitted from the back of the light guide, the support of the light sources comprises a reflective surface configured to reflect light rays emitted through the back surface of the light guide towards the light guide, the reflective surface being made of a white material or being covered by a layer of a white material, for example a white sheet or paint.

Advantageously, so as to further scatter and recycle the light emitted from the back of the light guide, at least a portion of the internal surface of the housing comprises a reflective surface configured to reflect light rays emitted through the back surface of the light guide towards the light guide, the reflective surface being made of a white material or being covered by a layer of a white material, for example a white sheet or paint.

Preferably, in order to create additional 3-dimensional effects or improve the ones provided by the first functional layer, the lamp module comprises a second functional layer located between the first functional layer and the translucent cover.

Preferably, in order to further create additional 3-dimensional effects or improve the ones provided by the first functional layer while keeping the lighting module compact, an air gap separates the first and second functional layers, the width of said gap being comprised between 2 mm (0.08 in) and 8 mm (0.3 in), preferably between 4 mm (0.16 in) and 6 mm (0.24 in), for example 5 mm (0.2 in).

To help focusing the light rays according to the motor vehicle lighting regulations, the translucent cover is a lens.

BRIEF DESCRIPTION OF THE FIGURES

The invention will be better understood upon reading the following description, which is given only as an example and is made with reference to the attached drawings in which.

DETAILED DESCRIPTION

Figure 1:
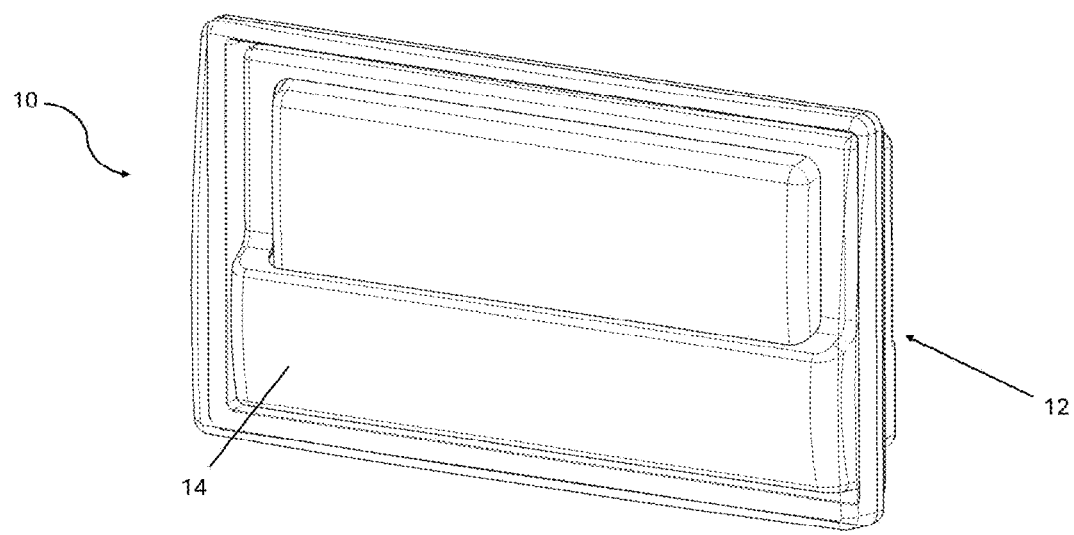
FIG. 1 is a perspective view of a lamp module according to an embodiment of the invention
Figure 2:
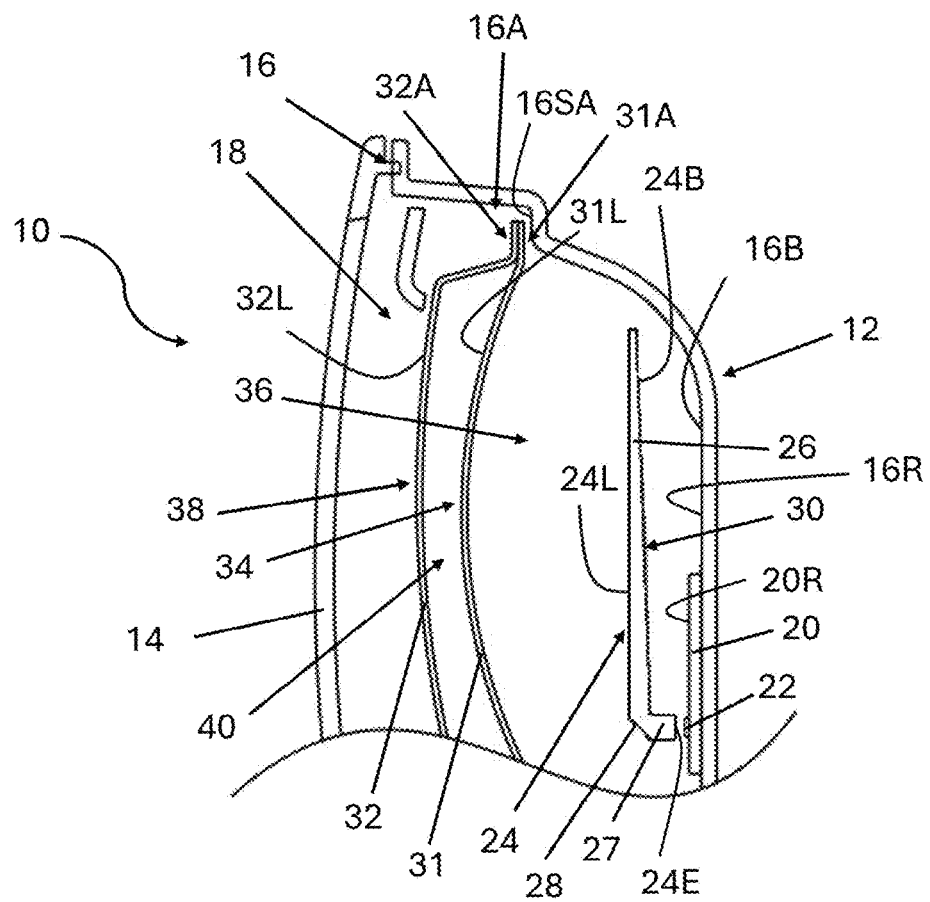
FIG. 2 is a cross-section of the lamp module of FIG. 1.

With reference to FIGS. 1 and 2, a motor vehicle lamp module 10 according to an embodiment of the invention, which is destined to be mounted in a motor vehicle, for example a car.

Lamp module 10 comprises a housing 12 that is covered by a translucent cover 14 which separates the lamp module from the external surroundings of the vehicle lamp module. To help focusing the light rays according to the motor vehicle lighting regulations, the translucent cover 14 is a lens.

In this particular example, housing 12 has the overall shape of a trough having an external border 16 to which the cover 14 is attached. The attachment can be made via screwing, gluing, welding or heat staking.

As can be seen on FIG. 2, the housing 12 and the cover 14 define between them an internal chamber 18.

Against said internal surface, or back surface 16B of the housing that is opposite the cover 14 that is substantially planar, a support 20 supporting a plurality of light sources 22 is attached. Considering that FIG. 2 is a cross-section of vehicle lamp module 10, only one light source 22 is visible.

In the embodiment shown on the Figures, the support 20 is a printed circuit board (PCB) 20. The light sources 22 supported by the PCBs here are light-emitting diodes (LEDs). In a variant, the light sources 22 could be organic light-emitting diodes (OLEDs). Preferably, LEDs 22 are arranged along a line and with a regular pitch on PCB 20.

Located inside the internal chamber 18 is a light guide 24, having an entry surface 24E located opposite the LEDs 22, which are configured to emit light rays into the light guide 24. The light guide 24 is made of an optically transmitting material, for example polycarbonate (PC) or poly(methyl) methacrylate (PMMA). An optically transmitting material is a translucent, semi-transparent or a transparent material. It may include materials that are milky, smoked, mottled, textured, surface printed, frosted, etc., as long as they allow light to go through.

The light guide 24 comprises a screen 26 which is defined by a front surface or light emitting surface 24L, through which most of the light rays having entered the light guide 24 are emitted, and a back surface 24B, opposite the light emitting surface 24L.

The light emitting surface 24L is located opposite the cover 14. Light emitting surface 24L is preferably substantially parallel to back surface 16B of the housing.

Back surface 24B includes a raised pattern 30, preferably including dents evenly distributed along the back surface 24B.

In this particular example, the back surface 24B and the light emitting surface 24L of the screen 26 are substantially planar. Back surface 24B forms a slight angle with light emitting surface 24L. Hence, screen 26 is substantially planar.

Screen 26 is connected to a base 27 of the light guide 24 that is also substantially planar and perpendicular to the light emitting surface 24L. Screen 26 and base 27 are linked by an oblique surface 28, forming a 45° angle with both screen 26 and base 27.

Advantageously, so as to scatter and recycle the light emitted from the back of the light guide 24, PCB 20 comprises a reflective surface 20R configured to reflect light rays emitted through the back surface 24B of the light guide towards the light guide 24.

The reflective surface 20R is made of a white material or is covered by a layer of a white material, for example a white sheet or paint.

Lamp module 10 also comprises, within internal chamber 18, a first functional layer 31 comprising an emitting surface 31L facing the translucent cover 14, configured to transmit the light rays exiting from its emitting surface 31L in at least a predetermined direction. In particular, first functional layer 31 can focus the light rays exiting from its emitting surface 31L in at least a predetermined direction. As will be explained below, emitting surface 31L of the first functional layer 31 does not directly face the translucent cover 14, as a second functional layer 32 is arranged between translucent cover 14 and first functional layer 31. However, emitting surface 31L of the first functional layer 31 is oriented towards the translucent cover 34.

The functional layer 31 is located between the light guide 24 and the cover 14. The light guide 24 faces the first functional layer 31.

The functional layer comprises a theromoformed sheet 31 made of an optically transmitting material including an emitting surface 31L. The thermoformed sheet can therefore be translucent, semi-transparent or transparent. In particular, the emitting surface 31L can be milky, smoked, mottled, textured, surface printed, frosted, etc., as long as it allows light rays to go through. Preferably, the thermoformed sheet 31 is made of a thermoplastic material.

The thermoformed sheet 31 that is attached, at a first end 31A, to a first internal surface 16SA of the lamp module 10 located at a first end 16A of the internal chamber. In this example, first end 31A of the sheet 31 is attached to a first internal surface 16SA of the housing 16. However, in other variants that are not shown, first end 31A of the sheet could be attached to a bezel or an outer lens.

The thermoformed sheet 31 is also attached, at a second end (not shown) to a second internal surface (not shown) of the lamp module 10 located at a second end of the internal chamber (not shown). In this example, the second end of the sheet 31 is also attached to an internal surface of the housing 16. However, in other variants that are not shown, second end of the sheet 31 could be attached to a bezel or an outer lens.

The attachment of the thermoformed sheet 31 to the housing 12 can be made using screws, adhesive, laser welding or heat staking.

Therefore, the thermoformed sheet 31 extends from one end to another end of the internal chamber 18, and preferably extends along the whole height of the housing 12.

The first sheet 31 is shaped so as to form, between its first end 31A and second end, a curved section 34 facing the emitting surface 24L of the light guide. The curved section 34 is preferably continuous.

First sheet 31 is flexible. Hence, the curved section 34 can for example be formed by bending the first sheet 31. This gives the first sheet 31 an overall non-planar shape. In particular, the shaping gives to the first sheet 31 an overall 3-dimensional shape.

In this particular example, the first sheet 31 has a cross-section in the shape of a C. However, other shapes can be considered, such as an S-shape, a D-shape, or any other shape depending on the required aesthetic effect.

The emitting surface of the light guide 24L and the curved section 34 of the sheet 31 are separated by an air gap 36 having a width the value of which is above 10 mm (0.4 in).

Preferably, the first sheet 31 is made of polycarbonate. Such a material can be easily shaped and has the required properties to obtain the sought 3-dimensional effects.

To limit the overall thickness of the lighting module 10 and to obtain a first sheet 31 that is easily shaped, the first sheet 31 has a thickness the value of which is comprised between 0.2 mm (0.008 in) and 0.8 mm (0.03 in).

As can be seen on FIG. 2, the width of the air gap 36 between the emitting surface 24L of the light guide and the curved section 34 of the first sheet 31 varies between the first end 31A of the sheet and the second end of the sheet.

To maximize the 3-dimensional effects, a central part of the emitting surface 24L of the light guide is located in the widest part of the air gap 36. In this case, the central part of the emitting surface 24L is the central part of the screen 26.

Preferably, in order to further create additional 3-dimensional effects and/or to homogenize the lighting output of the lighting module, the first sheet 31 comprises at least one functional element that is arranged on its surface and/or is part of its internal structure, adapted to bend the beams of light rays exiting from its emitting surface.

For example, the at least one functional element includes a raised element, for example a rib or a dimple.

According to a particular embodiment that limits the manufacturing costs, the raised element is obtained through thermoforming.

Preferably, to improve the esthetic features provided by the first sheet 31, and/or further increase the 3-dimensional effect, the functional element includes a line or pattern structure, for example obtained by a layer of print, for example a silk-screen, an ink jet print.

The first sheet 31 can also include ridges, bumps, grid lines, random valleys, raised patterns, etc.

Advantageously, so as to further scatter and recycle the light emitted from the back of the light guide 24, at least a portion of the back surface 16B of the housing comprises a reflective surface 16R configured to reflect light rays emitted through the back surface 24B of the light guide 24 towards the light guide 24. The reflective surface 16R can be made of a white material or being covered by a layer of a white material, for example a white sheet or paint. Here, the whole back surface 16B is a reflective surface 16R.

As mentioned above, preferably, in order to create additional 3-dimensional effects or improve the ones provided by the first functional layer 31, the lamp module 10 comprises a second functional layer 32 located between the first functional layer 31 and the translucent cover 14.

Second functional layer 32 comprises an emitting surface 32L directly facing the translucent cover 14, configured to transmit the light rays exiting from its emitting surface 32L in at least a predetermined direction. In particular, second functional layer 32 can focus the light rays exiting from its emitting surface 32L in at least a predetermined direction.

Here, the second functional layer 32 is also a thermoformed sheet, also preferably made of polycarbonate. Functional elements can also be provided in the structure or the surface of second functional layer 32, which may be similar or different from the ones of the first sheet 31.

In the same way as the first sheet 31, the second sheet 32 is shaped between its first end 32A and second end so as to obtain a curved section 38 facing the emitting surface 24L of the light guide, the first sheet 31 being located between the second sheet 32 and the light guide 24.

Here, the curved section 38 of the second sheet 32 is preferably continuous. In this particular example, the second sheet 32 has a cross-section in the shape of a D, as the curved section 38 is located between two planar surfaces. However, other shapes can be considered, such as a C-shape, an S-shape, or any other shape depending on the required aesthetic effect. It should be noted that the shapes of the first 31 and the second 32 sheets could be the same.

An air gap 40 separates the first functional layer and the second functional layer, the width of said gap being comprised between 2 mm and 8 mm, preferably between 4 and 6 mm, for example 5 mm.

It should be noted that the lamp module could include a third sheet, or even a fourth sheet, as long as they are shaped between their respective first and second ends so as to obtain a curved section facing the emitting surface of the light guide. The number of sheets is not limited.

The invention is not limited to the presented embodiments and other embodiments will clearly appear to the skilled person. Any combination of the afore-mentioned embodiments or variants is for example explicitly envisioned.

REFERENCES LIST

10: Vehicle lamp module
12: Lamp module housing
14: Translucent cover
16: External border of the housing
16A: First end of the internal chamber
16B: Back surface of the internal chamber
16R: Reflective surface of the internal chamber
16SA: First internal surface of the housing
18: Internal chamber
20: PCB
20R: Reflective surface of the PCB
22: LEDs
24: Light guide
24L: Light-emitting surface of the light guide
26: Screen of the light guide
28: Oblique surface of the light guide
30: Raised pattern
31: First sheet
31A: First end of the first sheet
31L: Emitting surface of the first sheet
32: Second sheet
32A: First end of the second sheet
32L: Emitting surface of the first sheet
34: Curved section of the first sheet
36: Air gap between the light guide and the first sheet
38: Curved section of the second sheet
40: Air gap between the two sheets

The invention claimed is:

1. A lamp module (10) for a motor vehicle comprising a housing (12) covered by a translucent cover (14) which separates the lamp module from the external surroundings of the vehicle lamp module, the housing and the translucent cover defining between them an internal chamber (18), the lamp module (10) further comprising, within the internal chamber (18):

at least one functional layer (31) comprising an emitting surface (31L) facing the translucent cover (14), configured to transmit light rays exiting from its emitting surface (31L) in at least a predetermined direction, a light guide (24) made of an optically transmitting material comprising an emitting surface (24L) facing the functional layer (31), a plurality of light sources (22) comprising light-emitting diodes, located opposite an entry surface (24E) of the light guide and configured to emit light rays into the light guide (24), characterized in that the functional layer (31) comprises a thermoformed sheet (31) made of an optically transmitting material that is attached, at a first end (31A), to a first internal surface (16SA) of the lamp module (10) located at a first end (16A) of the internal chamber and, is attached at a second end, to a second internal surface of the lamp module (10) located at a second end of the internal chamber, the sheet being shaped so as to form, between said first end (31A) and said second end, a curved section (34) facing the emitting surface (24L) of the light guide, the emitting surface (24L) of the light guide and the curved section (34) of the sheet being separated by an air gap (36) having a width the value of which is above 10 mm (0.4 in).

2. The lamp module (10) according to claim 1, wherein the sheet (31) is made of polycarbonate.

3. The lamp module (10) according to claim 1, wherein the sheet (31) has a thickness the value of which is comprised between 0.2 mm (0.008 in) and 0.8 mm (0.03 in).

4. The lamp module (10) according to claim 1, wherein the width of the air gap (36) between the emitting surface (24L) of the light guide and the curved section (34) of the sheet (31) varies between the first end (31A) of the sheet and the second end of the sheet, and a central part of the emitting surface (24L) of the light guide is located in the widest part of the air gap (36).

5. The lamp module (10) according to claim 1, wherein the sheet (31) comprises at least one functional element, the functional element being arranged on the surface of the sheet, being part of the internal structure of the sheet, or being arranged on the surface of the sheet and being part of the internal structure of the sheet, the functional element being adapted to bend the beams of light rays exiting from its emitting surface (31L).

6. The lamp module (10) according to claim 5, wherein the at least one functional element includes a raised element.

7. The lamp module (10) according to claim 6, characterized in that the raised element is obtained through thermoforming.

8. The lamp module (10) according to claim 5, wherein the functional element includes a line or pattern structure.

9. The lamp module (10) according to claim 1, wherein the light guide (24) comprises a back surface (24B), opposite its emitting surface (24L), which back surface comprises a raised pattern including dents (26) evenly distributed along the back surface (24B).

10. The lamp module (10) according claim 1, wherein the light sources (22) are located on a support (20) that is located against an internal surface (16B) of the housing, the support comprising a printed circuit board.

11. The lamp module (10) according to claim 10, wherein the support (20) of the light sources comprises a reflective surface (20R) configured to reflect light rays emitted through the back surface (24B) of the light guide (24) towards the light guide (24), the reflective surface (20R) being made of a white material or being covered by a layer of a white material, the white material comprising a white sheet or paint.

12. The lamp module (10) according to claim 10, wherein at least a portion of the internal surface (16B) of the housing comprises a reflective surface (16R) configured to reflect light rays emitted through the back surface (24B) of the light guide towards the light guide, the reflective surface (16R) being made of a white material or being covered by a layer of a white material, the white material comprising a white sheet or paint.

13. The lamp module (10) according to claim 1, characterized in that it comprises a second functional layer (32) located between the first functional layer (31) and the translucent cover (14).

14. The lamp module (10) according to claim 13, characterized in that an air gap (40) separates the first functional layer (31) and second functional layer (32), the width of said gap (40) being between 2 mm (0.08 in) and 8 mm (0.3 in).

15. The lamp module (10) according to claim 1, characterized in that the translucent cover (14) is a lens.

* * * * *